Patented Jan. 21, 1941

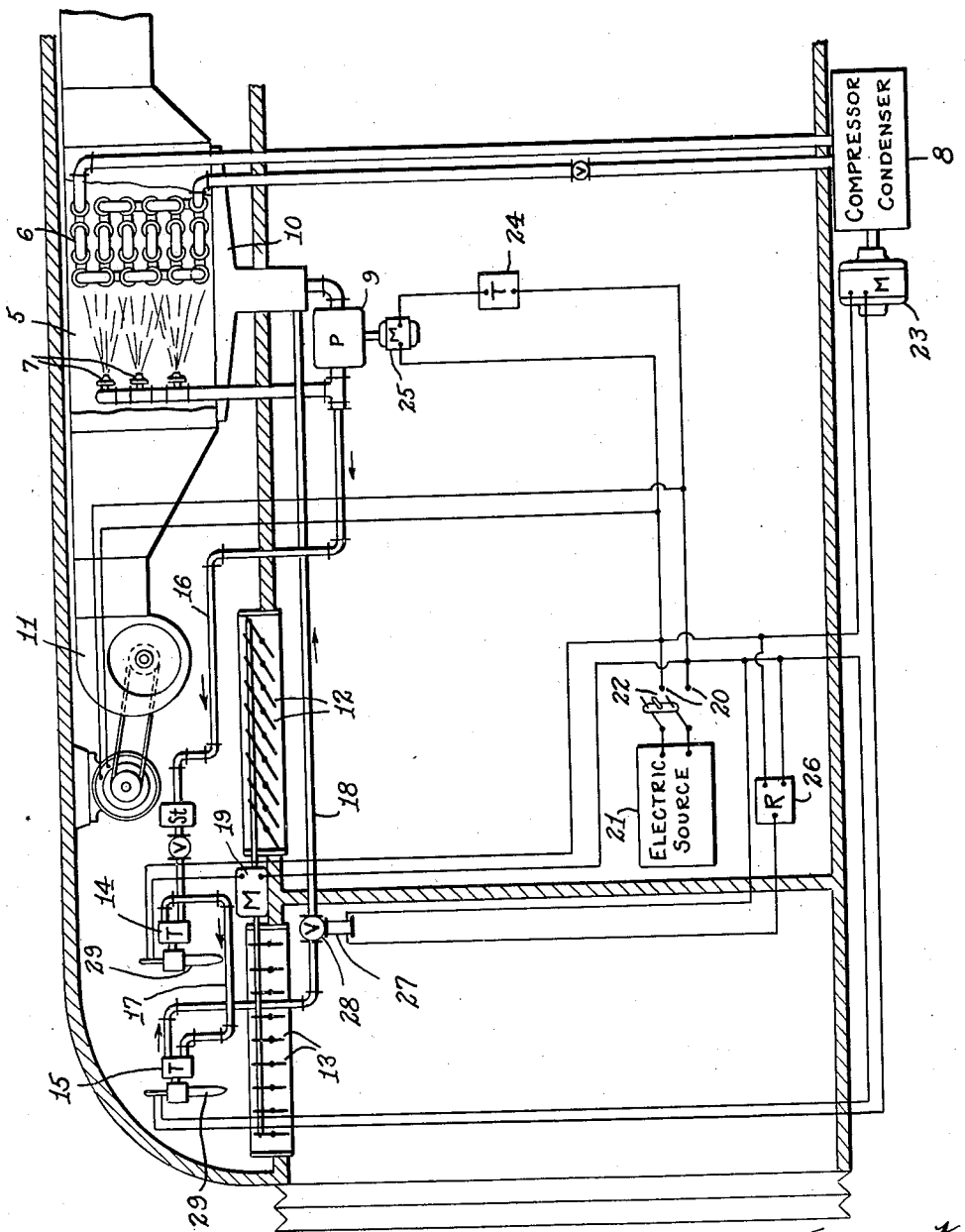

2,229,163

UNITED STATES PATENT OFFICE 2,229,163

REFRIGERATION CONTROL FOR AIR CONDITIONING

Samuel M. Anderson, Sharon, Mass., assignor to B. F. Sturtevant Company, Boston, Mass.

Application May 3, 1939, Serial No. 271,609

3 Claims. (Cl. 236—44)

This invention relates to the conditioning of air and relates more particularly to air conditioning systems for passenger vehicles.

It has been customary in the past to supply 25% outdoor air and 75% recirculated air at all times, for conditioning in passenger vehicles, such as railway passenger cars. I prefer for preventing odors and for providing purer and more pleasant air to normally use 100% outdoor and to use recirculated air only when the refrigerating load would render the use of all outdoor air economically unfeasible. I provide an efficient and adaptable control system responsive to changes in the wet bulb temperature of the outdoor air for causing the system to use all outdoor air when feasible.

An object of the invention is to supply conditioned outdoor air to a passenger vehicle.

Another and more definite object of the invention is to provide an efficient and effective temperature control system for controlling the supply of a maximum quantity of outdoor air to an air conditioned passenger vehicle.

Other objects of the invention will be apparent from the following description when read in connection with the drawing.

The invention will now be described with reference to the drawing which illustrates diagrammatically one embodiment of the invention applied to a railway passenger car.

With reference to the drawing, the overhead air conditioning unit 5 contains the evaporator tubes 6 and the spray nozzles 7 which spray water upon the tubes. The compressor-condenser unit 8 supplies any suitable volatile refrigerant to the tubes 6. The pump 9 recirculates water from the sump 10 to the nozzles 7.

The blower 11 draws in recirculated air through the dampers 12 and fresh outdoor air through the dampers 13 and forces the air into the conditioning unit 5.

The two wet bulb thermostats 14 and 15 which are of the type disclosed in the application Serial No. 231,457, filed September 24, 1938, by C. W. Peterson, are exposed to the outdoor air entering the system and are supplied with water through the pipe 16 from the pump 9. The thermostats 14 and 15 are connected in series as regards water flow and the excess water leaving the thermostat 14 flows through the pipe 17 to the thermostat 15 and the excess water leaving the thermostat 15 flows through the pipe 18 to the sump 10.

The controls of the thermostat 14 are connected in series in the circuit including the damper control motor 19 and the leads 20 to the electric source 21 so that when the switch 22 is closed, the circuit is completed. It is preferred that this circuit be opened at a wet bulb temperature of approximately 70° F., so that at and below this temperature the motor 19 is deenergized to adjust the dampers 13 to wide open position and to close the dampers 12 so that 100% outdoor air is supplied to the unit 5. For wet bulb temperatures above 70° F., the refrigerating load due to the use of all outdoor air is too great. For wet bulb temperatures below 70° F., the refrigerating load is less.

The contacts of the thermostat 15 are connected in the circuit including the motor 23 driving the compressor, and the leads 20 and the thermostat 15 functions when the wet bulb temperature drops below, say 65° F., to disconnect the motor 23 from the electric source 21.

The car thermostat 24 acts to start and stop the electric motor 25 driving the pump 9 and may act at say 72° F. to start the pump motor 25 and for temperatures below 72° F., to stop the motor. During the off periods of the pump, the tubes 6 act as air cooling coils provided of course the outdoor wet bulb temperature is above 65° F. so that the compressor is operating. During the on periods of the pump and compressor, the water sprayed upon the tubes 6 is cooled by the tubes to cool the air. The water also performs the additional functions of cleaning the tubes 6 and the air passing through the sprays and tubes.

The switch 22 is closed when the system is started up. When the switch is closed, the slow acting relay 26 is energized from the electric source 21 and it acts to close contacts connecting the solenoid 27 in circuit with the source 21 causing the solenoid to open the valve 28 in the water line 18. The purpose of this control is to cause an excess of water to be forced through the leather boots 29 of the thermostats 14 and 15 when the system is first started up to cause the outer surfaces of the boots to become wetted so that the thermostats 14 and 15 quickly respond to wet bulb temperature changes. This is caused by the back pressure in the thermostat outlets preventing exit of water except through the porous boots. When the switch is opened, the relay 26 and solenoid 27 act to close the valve 28 thus preventing the excess water from flowing from the thermostats 14 and 15. But, since the pump is shut down when the switch 22 is opened, there is no pressure to force the water through the thermostat boots. But when the switch 22 is again closed, the relay 26 through delay action prevents the solenoid 27 from opening the valve 28 until the pump 9 has been able to force water through the boots 29. The valve 28 opens after a short period of time and from then on, no excess of water is forced through the boots so that only sufficient for evaporation seeps through.

While one embodiment of the invention has been described for the purpose of illustration, it should be understood that the invention is not limited to the exact apparatus and arrangement of apparatus illustrated since modifications thereof may be suggested by those skilled in the art without departure from the substance of the invention.

I claim:

1. An air conditioning system comprising an air cooler, means for admitting outdoor air into said cooler, means including a wet bulb thermostat exposed to the outdoor air for adjusting said first mentioned means, means including a compressor for supplying refrigeration to said cooler, and a second wet bulb thermostat exposed to the outdoor air for controlling said compressor, said first mentioned thermostat acting to increase the volume of outdoor air at a predetermined wet bulb temperature, and said second thermostat acting to stop said compressor at a temperature substantially below said first mentioned temperature.

2. In an air conditioning system, a wet bulb thermostat, means for supplying water to said thermostat, means for initiating said means for initiating the supply of water to said thermostat, and means controlled by said initiating means for increasing momentarily the volume of water supplied by said first mentioned thermostat when said first mentioned means is initiated.

3. In an air conditioning system, a wet bulb thermostat, electrically controlled means for supplying water to said thermostat, means including a valve for varying the volume of water supplied by said means to said thermostat, means including a switch for supplying electric energy to said electrically controlled means, and means for adjusting said valve for increasing momentarily the volume of water supplied to said thermostat when said switch is closed.

SAMUEL M. ANDERSON.